(12) United States Patent
Kim

(10) Patent No.: US 9,098,188 B2
(45) Date of Patent: Aug. 4, 2015

(54) DISPLAY DEVICE AND METHOD FOR CONTROLLING THE SAME

(71) Applicant: LG ELECTRONICS INC., Seoul (KR)

(72) Inventor: Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 13/653,477

(22) Filed: Oct. 17, 2012

(65) Prior Publication Data

US 2014/0049483 A1 Feb. 20, 2014

(30) Foreign Application Priority Data

Aug. 20, 2012 (KR) .................. 10-2012-0090627

(51) Int. Cl.
  *G06F 3/041* (2006.01)
  *G06F 3/045* (2006.01)
  *G06F 3/0488* (2013.01)

(52) U.S. Cl.
  CPC .................................. *G06F 3/0488* (2013.01)

(58) Field of Classification Search
  None
  See application file for complete search history.

(56) References Cited

U.S. PATENT DOCUMENTS

| | | | |
|---|---|---|---|
| 2005/0197186 A1* | 9/2005 | Ohta ............................... | 463/30 |
| 2007/0236450 A1 | 10/2007 | Colgate et al. | |
| 2009/0322695 A1* | 12/2009 | Cho et al. ....................... | 345/173 |
| 2010/0026647 A1 | 2/2010 | Abe et al. | |
| 2010/0231550 A1* | 9/2010 | Cruz-Hernandez et al. .. | 345/174 |
| 2011/0050629 A1 | 3/2011 | Homma et al. | |
| 2011/0057880 A1* | 3/2011 | Kasahara ....................... | 345/158 |
| 2011/0169765 A1 | 7/2011 | Aono | |
| 2012/0154328 A1* | 6/2012 | Kono ............................. | 345/174 |

* cited by examiner

*Primary Examiner* — Alexander Eisen
*Assistant Examiner* — Nan-Ying Yang
(74) *Attorney, Agent, or Firm* — Birch, Stewart, Kolasch & Birch, LLP

(57) ABSTRACT

Disclosed herein are a display device and a method for controlling the same. Herein, the method for controlling the display device includes the steps of displaying a first object and a second object, wherein the first object is displayed so that at least a portion can overlay a first region of the second object, determining a first pressure condition being required for controlling the first object within the first region of the second object, detecting a first touch input touching a region in which the first object is displayed, detecting a second touch input controlling the first object, controlling the first object corresponding to the second touch input, when a pressure level of the first touch input satisfies the first pressure condition, and allowing the second touch input to bypass the first object, when the pressure level does not satisfy the first pressure condition.

21 Claims, 10 Drawing Sheets

Low-level pressure

High-level pressure

Low-level pressure

High-level pressure

DISPLAY DEVICE AND METHOD FOR CONTROLLING THE SAME

This application claims the benefit of the Korean Patent Application No. 10-2012-0090627, filed on Aug. 20, 2012, which is hereby incorporated by reference as if fully set forth herein.

BACKGROUND OF THE INVENTION

1. Field of the Invention

The present invention relates to a display device and, more particularly, to a display device and a method for controlling the same that can sense a pressure of a touch input and control a displayed object.

2. Discussion of the Related Art

With the increase in the usage of diverse types of display devices, a method for conveniently inputting control commands of the user is constantly being researched and developed. The method for inputting the user's control command has evolved from being performed by using peripheral devices, such as a keyboard, a mouse, and so on, to being performed by receiving a user's touch on a touch screen. Herein, the display device including the touch screen may detect the user's touch input, thereby processing the detected touch input as a control command. The user may use the touch screen so as to move or activate a displayed object, and the display device may generate diverse types of feedback based upon an inputted touch input.

A feedback respective to a touch input, which is inputted by the user, may provide a sense of moving or controlling a displayed object in an real space, instead of a virtual space. And, in order to do so, the display device may provide tactile feedback based upon attributes of a touch input and attributes of a displayed object.

SUMMARY OF THE INVENTION

Accordingly, the present invention is directed to a display device and a method for controlling the same that substantially obviate one or more problems due to limitations and disadvantages of the related art.

Most particularly, another object of the present invention is to provide a display device and a method for controlling that same that can provide feedback to users based upon attributes of a displayed object and attributes of a touch input respective to the displayed object.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, a method for controlling a display device includes the steps of displaying a first object and a second object, wherein the first object is displayed so that at least a portion of the first object overlays with a first region of the second object, determining a first pressure condition being required for controlling the first object within the first region of the second object, wherein the first pressure condition is determined with respect to an attribute of the first object and to an attribute of the first region included in the second object, detecting a first touch input touching a region in which the first object is displayed, detecting a second touch input controlling the first object, wherein the second touch input is inputted in succession to the first touch input, controlling the first object by using the second touch input, when a pressure level of the first touch input satisfies the first pressure condition, and allowing the second touch input to bypass the first object, when the pressure level of the first touch input does not satisfy the first pressure condition.

According to another embodiment of the present invention, a display device includes a touch sensitive display unit configured to detect a touch input, and a controller configured to control the touch sensitive display unit. Herein, the display device may display a first object and a second object, wherein the first object is displayed so that at least a portion of the first object overlays with a first region of the second object, may determine a first pressure condition being required for controlling the first object within the first region of the second object, wherein the first pressure condition is determined with respect to an attribute of the first object and to an attribute of the first region included in the second object, may detect a first touch input touching a region in which the first object is displayed, may detect a second touch input controlling the first object, wherein the second touch input is inputted in succession to the first touch input, may control the first object by using the second touch input, when a pressure level of the first touch input satisfies the first pressure condition, and may allow the second touch input to bypass the first object, when the pressure level of the first touch input does not satisfy the first pressure condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
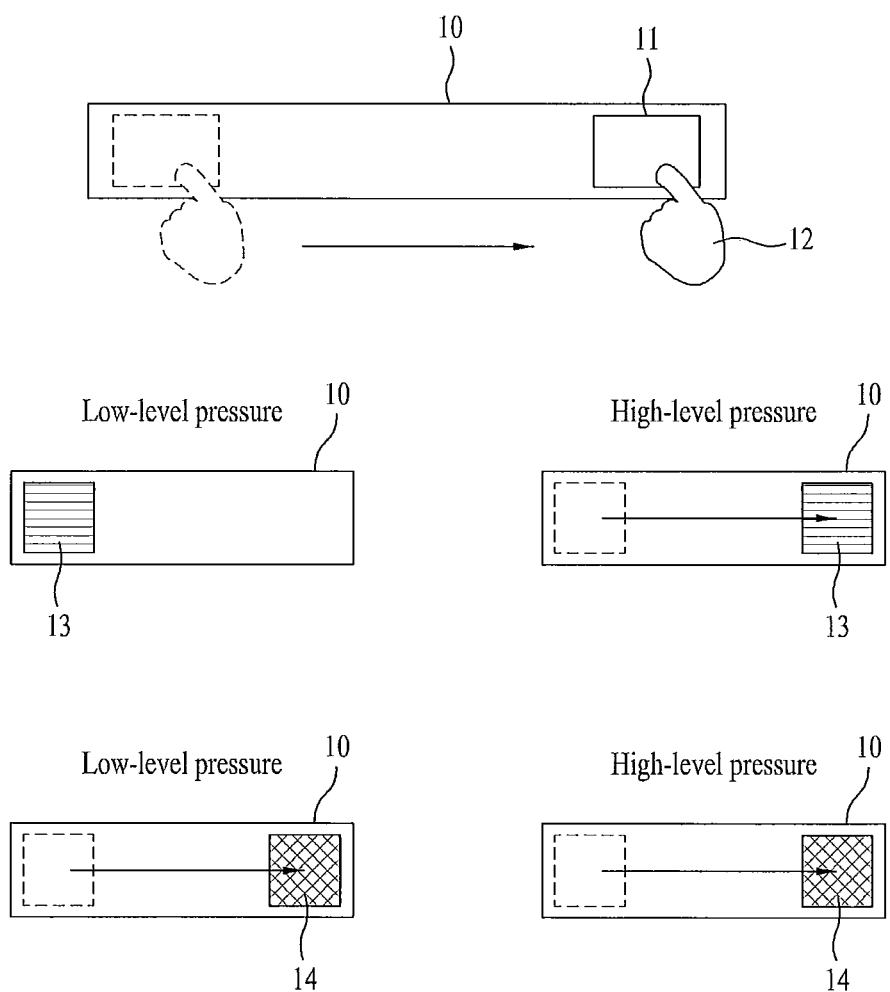
FIG. 1 illustrates a method of executing a user's touch input with respect to an attribute of a displayed object according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein.

Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

The display device according to the present invention may display one or more objects which overlays with another one or more objects. For example, the display device may display a first object so that the first object can overlap a partial area of a second object. Hereinafter, the second object being displayed by having a partial area overlapped by the first object may be referred to as a background image. The display device may detect a touch input performed on the displayed objects and may receive a control command respective to the corresponding objects. The touch input detection procedure may include a process of detecting a pressure of a touch input, and the pressure of a touch input may be detected by using a piezoelectric sensor, which is included in the display device. Additionally, the touch input detection procedure may be performed by using a surface area of a touch input being detected by the display device. For example, as the surface area of a user's finger being detected on a display unit of the display device becomes larger, the display device may detect the pressure of the touch input as being greater. The display device may decide whether or not to apply the detected touch input to the corresponding object, and such decision may be made with respect to the pressure of the detected touch input. Hereinafter, according to an exemplary embodiment of the present invention, an example of deciding whether or not to apply a touch input of dragging and controlling an object, which is displayed over the background image, on the corresponding object will be described in detail. Hereinafter, although the following example presents an object being displayed over a background image, the scope of the present invention may be identically applied to cases of multiple objects being displayed while having partial areas overlapping one another. Furthermore, although the exemplary embodiment of the present invention described below corresponds to a case when an object is being moved, the present invention may also be applied to diverse embodiments of the present invention wherein the corresponding object is being controlled.

FIG. 1 illustrates a method of executing a user's touch input with respect to an attribute of a displayed object according to an exemplary embodiment of the present invention. The display device may decide whether or not to apply a user's touch input on an object with respect to an attribute of the displayed object. The attribute of a displayed object may include texture, weight, mass, shape, and so on, of the corresponding object. Most particularly, when a user's touch input is being inputted, the texture of the object may function as an element for deciding a tactile feedback that is to be provided to the user. Depending upon the attribute of the displayed object, the display device may decide whether or not to apply the user's touch input to the corresponding object.

As shown in FIG. 1, the display device may display a background image 10, and the display device may then display an object 11 over the background image 10. The display device may detect a touch input 12 dragging the object 11. Thereafter, the display device may decide whether or not to relocate and display the corresponding object 11 in accordance with the detected touch input 12. In the example shown in FIG. 1, when touch inputs each having a different attribute are being detected with respect to a plurality of objects each having a different attribute, each touch input is processed. Hereinafter, although a texture is being given as an example of the attribute of an object, this will not limit the scope of the present invention.

A first object 13 may have a smooth texture, and a second object 14 may have a rough texture. The display device may set up pressure threshold value, which corresponds to a minimum pressure value, which is required for relocating each object with respect to the texture of each object. Herein, the display device may set a high pressure threshold value for the object having a smooth texture, and the display device may set a low pressure threshold value for the object having a rough texture. In case the pressure of the touch input 12 exceeds the pre-set pressure threshold, the corresponding touch input 12 may be applied to the corresponding object.

As shown in FIG. 1, when the touch input 12 dragging the object has a low-level pressure, the first object 13 may remain in its initial position without being moved or relocated. This is because the low-level pressure of the first object 13 is lower than the pre-set pressure threshold, which is described above. Alternatively, when the touch input 12 has a high-level pressure, the first object 13 may be relocated to a new position, which is designated by the dragging motion of the touch input 12. This is because the high-level pressure of the first object 13 exceeds the pre-set pressure threshold, which is described above. When the same touch input 12 is applied to the second object 14, the second object 14 may be relocated to new positions with respective to each of the low-level pressure and the high-level pressure. This is because the pressure threshold of the second object 14 is set to be relatively lower than the pressure threshold of the first object 13. Accordingly, the low-level pressure of the input touch 12 is lower than the pre-set pressure threshold respective to the second object 14, and the high-level pressure of the input touch exceeds the pre-set pressure threshold respective to the second object 14.

As described above, the relocation of the first object 13 and the relocation of the second object 14 may be differently decided with respect to the same touch input 12 due to the different attributes of each object. More specifically, the low-level pressure of the touch input 12 is lower than the pressure threshold of the first object 13, and the low-level pressure of the touch input 12 is greater than the pressure threshold of the second object 14. Accordingly, with respect to the touch input 12 of the low-level pressure, the first object 13 may not be moved, and the second object 14 may be moved. Additionally, the high-level pressure of the touch input 12 is greater than the pressure threshold of the first object 13, and the high-level pressure of the touch input 12 is also greater than the pressure threshold of the second object 14. Accordingly, with respect to the touch input 12 of the high-level pressure, the first object 13 may not be moved, and the second object 14 may be moved. The pressure threshold of each object may be decided by the attribute of each object. Furthermore, with respect to objects having the same attribute, the display device may set the pressure threshold to have different values in accordance with the texture of the background image respective to a position at which the corresponding object is located. This will be described in more detail with reference to FIG. 4.

According to another embodiment of the present invention, the display device may calculate the frictional force between each object and the user's finger, so as to decide whether or not to move the corresponding object. Then, based upon a frictional force threshold, which is set for each object, the display device may decide whether or not to move the corresponding object. The display device may determine a friction coefficient based upon the texture of each object. For example, in FIG. 1, the display device may set the friction coefficient between the first object 13 and the user's finger to '1', and the display device may set the friction coefficient between the second object 14 and the user's finger to '2'. When the pressure of the touch input 12, which is applied to the first and second object, is identically equal to N, the frictional force respective to the first object 13 may be equal to N, and the frictional force respective to the second object 14 may be equal to 2N. Accordingly, when the same pressure is applied to two different objects, the size of the frictional force of one object may be equal to two times the size of the frictional force of the other object. More specifically, when the frictional force threshold of each object is equal to 1.5N, the display device may display the first object 13 by maintaining the first object 13 in its initial position without moving the first object 13, and the display device may display the second object 14 by relocating the second object 14 to a new position, which is designated by the dragging motion of the touch input 14. Although the frictional force between the user's finger and the object is given as an example in the above-described example, the display device according to the present invention may also calculate a frictional force of a tool, which inputs the touch input, so as to device whether or not to move the corresponding object.

When the display device detects a touch input respective to each object, a tactile feedback may occur. The display device may generate tactile feedback with respect to at least one of a touch input and an object attribute. Additionally, the display device may also generate tactile feedback based upon the attributes of both the object and the background image. In FIG. 1, when the user touches the first object 13, the display device may generate a smooth tactile feedback having a low friction coefficient. And, when the user touches the second object 14, the display device may generate a rough tactile feedback having a high friction coefficient. Accordingly, the user may be provided with different tactile feedbacks for each object, and the user may then be capable of deciding the pressure level that is to be differently applied to each object. More specifically, when the display device detects a touch input respective to the first object 13, the display device may generate a smooth tactile feedback, so as to notify the user that he should press and hold the first object 13 by applying a high-level pressure in order to be capable of dragging and relocating the corresponding object. Alternatively, when the display device detects a touch input respective to the second object 14, the display device may generate a rough tactile feedback, so as to notify the user that he may be capable of dragging and relocating the corresponding object by simply pressing and holding the second object 14 even by applying a low-level pressure.

Figure 2:
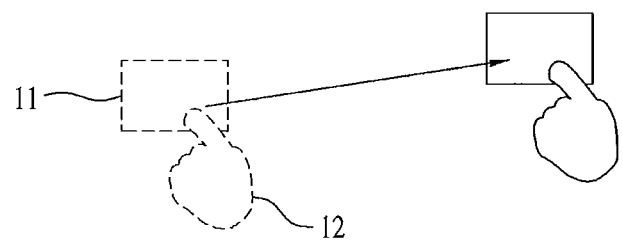
FIG. 2 illustrates a method of determining a limited movement range of an object with respect to a user's touch input according to the exemplary embodiment of the present invention.
Figure 2:
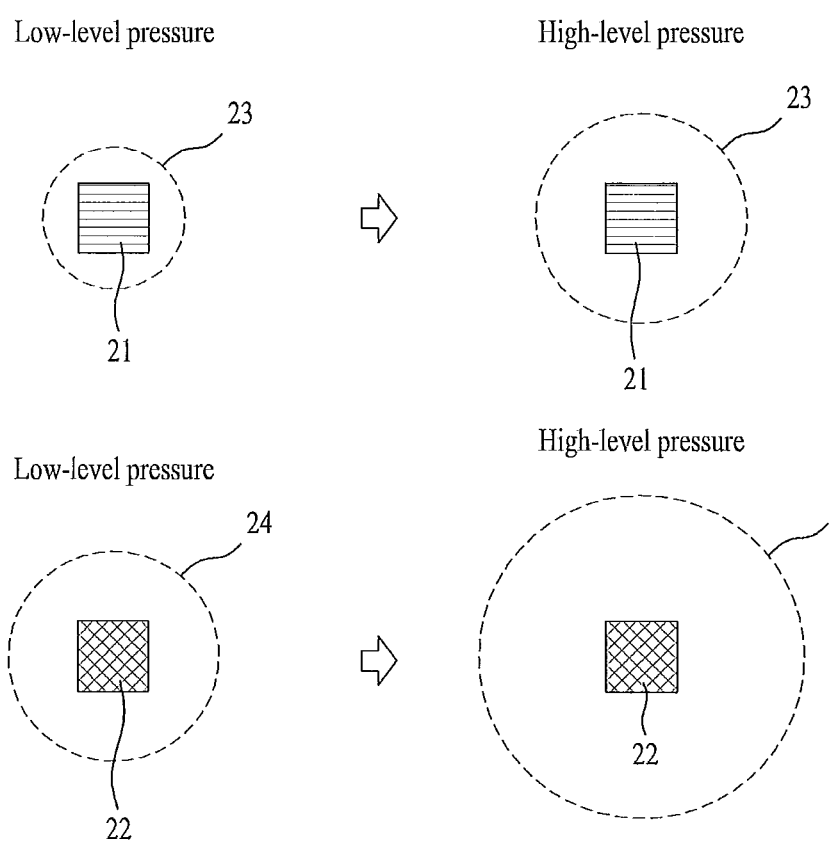

FIG. 2 illustrates a method of determining a limited movement range of an object with respect to a user's touch input according to the exemplary embodiment of the present invention. The display device may detect a touch input 12 of the user respective to an object 11. Additionally, when the object 11 is dragged by the user's touch input 12, the display device may display the object 11 after changing the location of the corresponding object 11. With respect to the pressure of the touch input 12, the display device may determine a limited movement range within which the object can be relocated. Herein, the limited movement range refers to a maximum movement distance to which the object can be moved by the touch input.

In FIG. 2, a first object 21 may have a smooth texture, and a second object 22 may have a rough texture. With respect to the pressure of the touch input 12, the display device may determine the limited movement range, which corresponds to the maximum movement distance to which each object can be moved by the touch input. For example, the display device may determine the limited movement range in proportion to the pressure of the touch input. Moreover, the limited movement range may be determined based upon the attributes of each object. The display device may perform a simulation on the texture of the displayed object, so as to determine the friction coefficient. Then, the display device may determine the limited movement range in proportion to the determined friction coefficient. With respect to the determined limited movement range, the display device may display the boundaries to which the corresponding object may be moved.

When a touch input having a low-level pressure is inputted with respect to the first object 21, the display device may determine the limited movement range 23 of the first object 21 with respect to the attribute of the first object 21 and the low-level pressure of the touch input 12. Herein, the limited movement range 23 may be displayed on the display device. And, depending upon the embodiment of the present invention, the limited movement range 23 may not be displayed on the display device. Moreover, as shown in FIG. 2, although the limited movement range 23 is illustrated in circular broken lines, according to other embodiments of the present invention, the limited movement range 23 may also be illustrated in other shapes and forms. When a touch input having a high-level pressure is inputted with respect to the first object 21, the display device may set up a limited movement range that is greater than the limited movement range, which has been set up at the point when the touch input having a low-level pressure was inputted. More specifically, when touch input having different pressure levels are being inputted with respect to the same object, the limited movement range 23 may be differently set up in accordance with the different pressure levels.

When a touch input having a low-level pressure is inputted with respect to the second object 22, the display device may determine the limited movement range 24 of the second object 22 with respect to the attribute of the second object 22 and the pressure level of the touch input 12. Herein, the second object 22 has a rougher texture as compared to the first object 21. Accordingly, even if the same input touch having a low-level pressure is being inputted, the limited movement range 24 of the second object 22 may be determined to be greater than the limited movement range 23 of the first object 21. This may also be equally applied when a touch input having a high-level pressure is being inputted. More specifically, when a touch input having the same pressure level is being inputted with respect to multiple objects each having a different attribute, the display device may set up different limited movement range values in accordance with the attributes of each object.

According to another embodiment of the present invention, the display device may determine the frictional force between each object and the user's finger, so as to decide the limited movement range of an object. Then, based upon the texture of each object, the display device may determine the friction coefficient. For example, in FIG. 2, the display device may set the friction coefficient between the first object 21 and the user's finger to '1', and the display device may set the friction coefficient between the second object 22 and the user's finger to '2'. When the pressure of the touch input 12, which is applied to the first and second object, is identically equal to N, the frictional force respective to the first object 21 may be equal to N, and the frictional force respective to the second object 22 may be equal to 2N. Accordingly, when the same pressure is applied to two different objects, the size of the frictional force of one object may be equal to two times the size of the frictional force of the other object. In another example, the display device of FIG. 2 may detect the low-level pressure of the touch input as N, and the display device may detect the high-level pressure of the touch input as 2N. In case the objects respective to the detected touch inputs have the same friction coefficient of '1', the frictional force respective to the low-level pressure may be equal to N, and the frictional force respective to the high-level pressure may be equal to 2N. Accordingly, the size of the frictional force respective to the pressure level of one touch input detected for an object may be equal to two times the size of the frictional force respective to another pressure level of the touch input detected for the same object. Eventually, depending upon the size of the frictional force respective to each object, the limited movement range within which each object can be moved and relocated may be determined differently. Although the frictional force between the user's finger and the object is given as an example in the above-described example, the display device according to the present invention may also calculate a frictional force of a tool, which inputs the touch input, so as to device whether or not to move the corresponding object.

Figure 3:
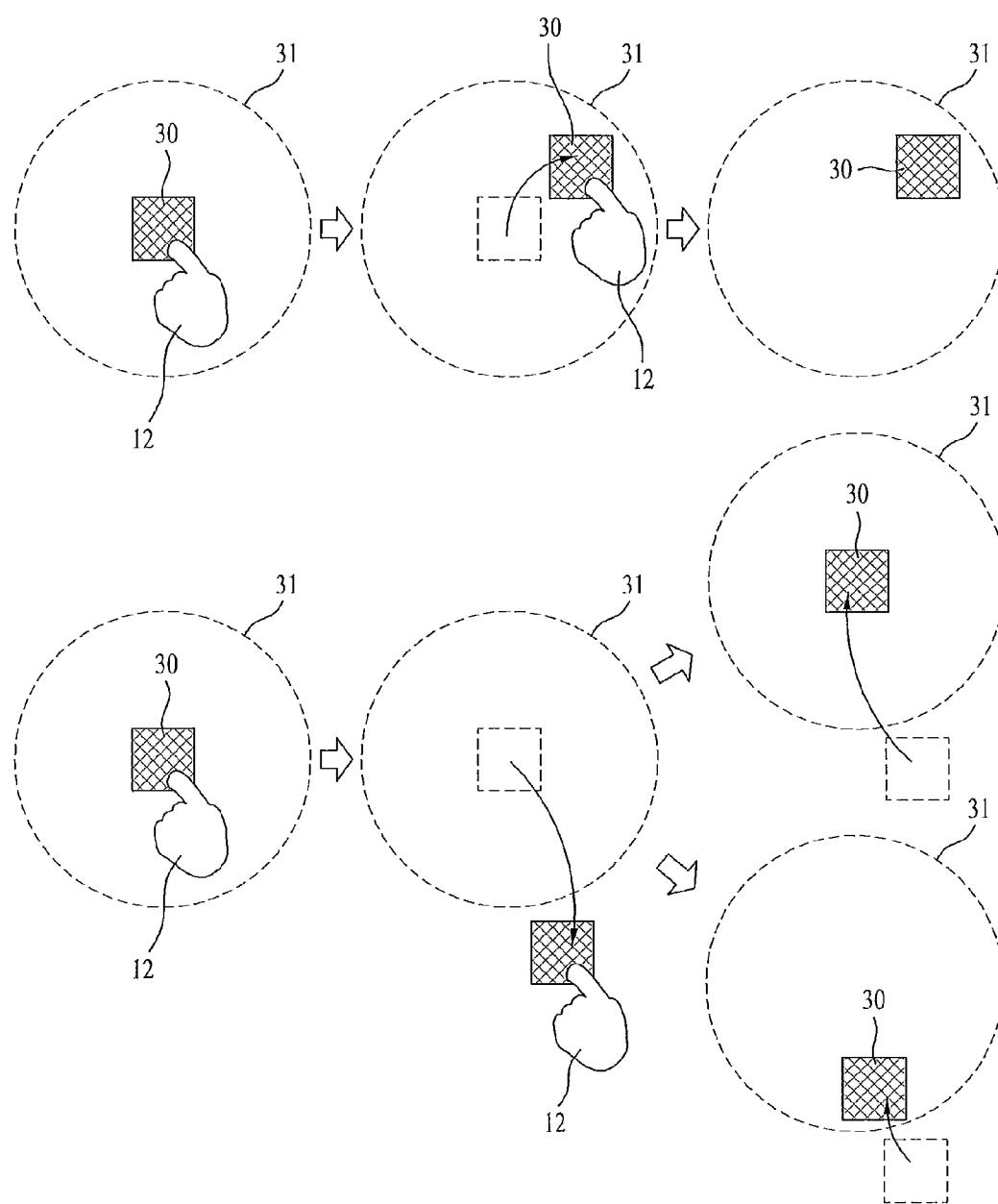
FIG. 3 illustrates a method of displaying an object with respect to the limited movement range according to the exemplary embodiment of the present invention.

FIG. 3 illustrates a method of displaying an object with respect to the limited movement range according to the exemplary embodiment of the present invention. The display device may decide a final position of an object, which is dragged by the touch input with respect to the limited movement range. As shown in the upper portion of FIG. 3, the display device may display an object 30, which is repositioned to a final position within the limited movement range 31 in accordance with the dragging motion of the touch input 12, the touch input 12 being detected with respect to the corresponding object 30. When a touch input 12 is inputted, the display device may detect the inputted touch input 12, and then the display device may determine a limited movement range 31 in accordance with the detected touch input 12. When the object 30 is repositioned by the touch input 12, the display device may decide whether or not the newly decided position is included in the range of the limited movement range 31. And, when the newly decided position in included in the range of the limited movement range, the display device may maintain the object 30 to its new position and may display the corresponding object 30 accordingly.

As shown in the lower portion of FIG. 3, when the newly decided position of the object 30 exceeds the limited movement range 31, due to the detected touch input 12, the display device may reset the position of the object 30 back to its initial position, prior to moving the corresponding object 30 with respect to the detected touch input 12.

More specifically, by comparing the limited movement range, which is determined with respect to the object 30 with a movement distance of the object 30 due to the detected touch input 12, the display device may decide whether or not to apply the corresponding touch input 12 to the object 30. When the relocation distance of the object respective to the touch input is smaller than the limited movement range, the corresponding touch input 12 may be applied to the object 30. However, when the relocation distance of the object respective to the touch input exceeds the limited movement range, the corresponding touch input 12 may not be applied to the object 30, or the corresponding touch input 12 may be modified and then be applied to the object 30.

Figure 4:
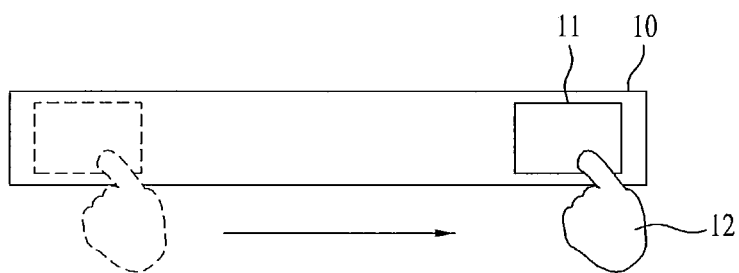
FIG. 4 illustrates a method of executing a user's touch input with respect to an attribute of a background image according to the exemplary embodiment of the present invention.
Figure 4:
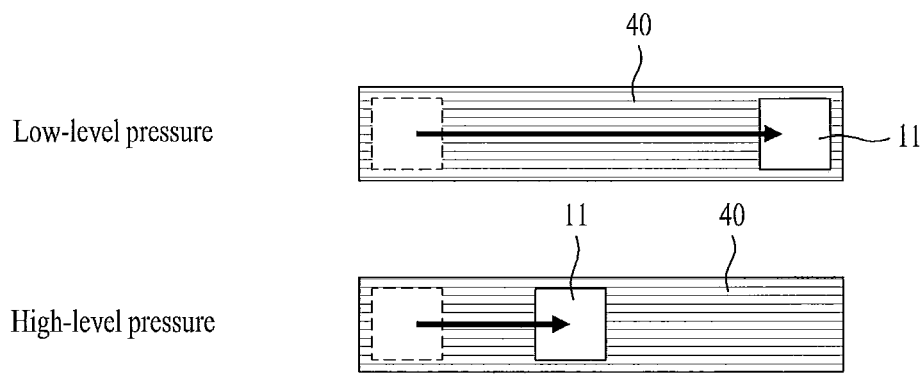
Figure 4:
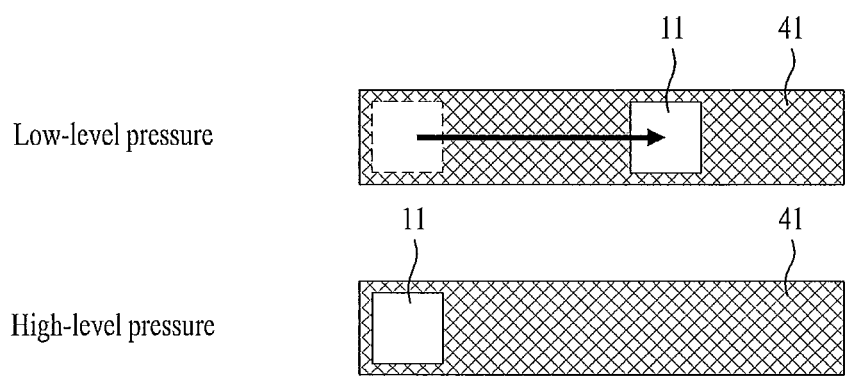

FIG. 4 illustrates a method of executing a user's touch input with respect to an attribute of a background image according to the exemplary embodiment of the present invention. The display device may detect a user's touch input 12 respective to an object 11, which is displayed over a background image 10. Also, when the object 11 is dragged from left to right by the touch input 12, the display device may modify the position of the corresponding object 11 and may display the object accordingly. In the example shown in FIG. 4, when multiple touch inputs, each having a different attribute, are detected with respect to background images 10, each having a different attribute, the detected touch inputs are processed and displayed as shown in FIG. 4. Hereinafter, in the following description of the present invention, texture is given as an example of the many attributes of the background image, and pressure of the touch input is given as an example of the many attributes of the touch input. However, this is merely exemplary, and, therefore, the scope of the present invention will not be limited only to the examples presented herein.

A first background image 40 may have a smooth texture, and a second background image 41 may have a rough texture. The display device may decide a degree of interference between an object and a background image with respect to at least any one of the texture of each background image and the pressure of each touch input 12. Additionally, with respect to the decided degree of interference, the display device may determine a speed, at which each object is being relocated, and a distance, to which each object is being relocated. As described above with reference to FIG. 2, the display device shown in FIG. 4 may also determine a limited movement range of an object with respect to the texture of the background image. Moreover, the display device may reduce a dragging distance of the touch input, which drags the corresponding object, with respect to the decided degree of interference. More specifically, the display device may reduce a distance, to which the corresponding object is dragged by the touch input, to a predetermined ratio in accordance with the degree of interference. Then, the display device may relocate the corresponding object to the reduced dragging distance and may display the relocated object.

When an object is relocated over the background image 40 having a smooth texture within respect to the same touch input 12, the display device may relocate the corresponding object to a distance further at a faster speed as compared to when relocating the same object over the background image 41 having a rough texture. Additionally, the display device may determine the movement speed and the movement distance of the corresponding object in inverse proportion to the pressure level of the touch input 12. More specifically, the display device may determine the degree of interference between the object 11 and the background image 40 in proportion to the pressure level of the touch input 12.

According to another embodiment of the present invention, the display device may decide a pressure threshold, to which the object may move and be repositioned on the background image 40 with reference to the texture of each background image. For the background image 40 having a smooth texture, the display device may set up a high pressure threshold. And, for the background image 41 having a rough texture, the display device may set up a low pressure threshold. When the display device detects a touch input having a pressure level lower than the determined pressure threshold, the display device may apply the corresponding touch input to the object. More specifically, in FIG. 4, the display device may move the object 11 over the background image with respect to the touch input 12 and may display the repositioned object 11. Alternatively, when the display device detects a touch input having a pressure level equal to or greater than the determined pressure threshold, the display device may not apply the corresponding touch input to the object and may bypass the object.

As shown in FIG. 4, when the touch input 12 dragging the object 11 over the first background image 40 has a low-level pressure, the display device may determine the degree of interference between the object and the first background image 40 to a lower level. This is because the first background image has a smooth texture and because the pressure of the touch input corresponds to a low-level pressure. Accordingly, the display device may relocate the object 11 up to a right-side boundary region over the first background image 40. Alternatively, when the touch input 12 dragging the object 11 over the first background image 40 has a high-level pressure, the display device may determine the degree of interference between the object and the first background image 40 to a higher level. This is because the degree of interference between the background image and the object increases as the pressure of the touch input 12 increases. Accordingly, the display device may reduce the dragging distance of the touch input, which drags the object, with respect to the degree of interference, which is set to up a high level. More specifically, the display device may reduce the dragging distance of an object, which is moved and relocated from the left-side boundary to the right-side boundary of the first background image, with respect to the touch input. Accordingly, the display device may relocate the corresponding object to a middle portion of the background image instead of moving the corresponding object up to the right-side boundary region of the background image.

As described above, the display device may relocate an object 11, which is displayed over the first background image 40, with respect to touch inputs 12 having a low-level pressure and a high-level pressure and may display the relocated object 11. This is because each of the low-level pressure and the high-level pressure has a value less than the pressure threshold, which is determined with respect to the texture of the first background image.

When the touch input 12 dragging the object 11 over the second background image 41 has a low-level pressure, the display device may determine the degree of interference between the object and the second background image 41. Since the second background image 41 has a rough texture, and since the pressure of the touch input corresponds to a low-level pressure, the display device may set up and determine the degree of interference to a higher value, as compared to when a touch input having a low-level pressure is inputted over the first background image 40. Accordingly, the movement speed and the movement distance of the object over the second background image may be set to have values lower than the values of the movement speed and movement distance of the object over the first background image.

When a touch input 12, which drags the object 11 over the second background image 41, has a high-level pressure, the display device may display the corresponding object 11 from its initial position, without relocating the object 11. Herein, the display device may set the degree of interference between the object and the second background image 41 to a maximum value. And, in this case, the movement speed and the movement distance of the object may be set to zero ('0'). In other words, since the touch input having the high-level pressure has a value equal to or greater than a pressure threshold, which is set up with respect to the texture of the second background image 41, the display device may not apply the corresponding touch input to the object and may bypass the object. Therefore, despite the touch input 12 performs dragging motions, the display device may not move and reposition the corresponding object 11.

As described above, the display device may relocate the position of the object 11 over the second background image 41 with respect to the touch input 12 having a low-level pressure and may then display the relocated object 11. This is because the low-level pressure has a value lower than the pressure threshold, which is determined with respect to the texture of the second background image 41. However, the display device may not relocate the position of the object 11 over the second background image 41 with respect to the touch input 12 having a high-level pressure. And, accordingly, the display device may not display the relocated object, and the touch input 12 having the high-level pressure may be bypassed. This is because the high-level pressure has a value greater than the pressure threshold, which is determined with respect to the texture of the second background image 41.

According to another embodiment of the present invention, the display device may calculate a frictional force between each object and the background image, so as to decide the movement distance and the movement speed of each object. The display device may set up and determine a friction coefficient based upon the texture of each background image. Moreover, the display device may decide the frictional force between each object and the background image based upon both the pressure of the touch input and the friction coefficient. Then, the display device may determine the movement distance and the movement speed of a corresponding object with respect to the decided frictional force. Furthermore, the display device may determine a frictional force threshold of the object with respect to the decided frictional force.

For example, referring to FIG. 4, the display device may set a frictional force between the object 11 and the first background image 40 to be equal to '1', and the display device may set a frictional force between the object 11 and the second background image 41 to be equal to '2'. In case the pressure of the touch input 12 is equally set to N, the frictional force between the object 11 and the first background image 40 may become N, and the frictional force between the object 11 and the second background image 41 may become 2N. Therefore, the size of the frictional force between one object and the background image may become two times the size of the frictional force between another object and the background image with respect to the same pressure level. Accordingly, the display device may determine the movement speed and the movement distance of the object for each background image with respect to the same pressure level, so that the movement speed and the movement distance can have different values. Thereafter, the display device may display the objects in accordance with the new positions. The display device may determine the frictional force between the object and the background image, which is decided as described above, as the frictional force threshold of the corresponding object. The frictional force threshold of the object may act as a basis enabling the display device to decide whether or not to apply a touch input to a corresponding object. When the frictional force between the user's finger, which inputs the touch input, and the corresponding object is greater than the frictional force threshold, the display device may apply the corresponding touch input to the respective object.

Additionally, in another example, referring to FIG. 4, the display device may detect a low-level pressure of a touch input being inputted to an object over a background image as 1N, and the display device may detect a high-level pressure of a touch input being inputted to an object over the same background image as 2N. When the friction coefficient between the object 11 and the background image is set to be equal to '1', and when a touch input having a low-level pressure is being inputted, the display device may determine the frictional force between the object 11 and the background image as N. Alternatively, when the friction coefficient between the object 11 and the background image is set to be equal to '1', and when a touch input having a high-level pressure is being inputted, the display device may determine the frictional force between the object 11 and the background image as 2N. Accordingly, for the same background image, the size of the frictional force between one object and the background image may be two times the size of the frictional force between another object and the background image in accordance with the pressure level of the touch input. Therefore, for each object being displayed over the same background image, the display device may set up different movement speeds and movement distances for each pressure level of the touch input, and the display device may then display the corresponding objects accordingly. The display device may determine the frictional force between the object and the background, which is decided as described above, as the frictional force threshold of the corresponding object. When the frictional force between the user's finger, which inputs the touch input, and the object is greater than the frictional force threshold of the corresponding object, the display device may apply the corresponding touch input to the respective object.

When the display device detects a touch input respective to each object, the display device may generate a tactile feedback. Herein, the display device may generate tactile feedback with respect to at least one of a background image and a pressure level of a touch input. Referring to FIG. 4, when the user drags an object 11 over the first background image 40 by applying a low-level pressure, the display device may generate a smooth tactile feedback having a low frictional force. And, when the user drags an object 11 over the second background image 41 by applying a high-level pressure, the display device may generate a rough tactile feedback having a high frictional force.

The user is provided with different tactile feedbacks respective to multiple objects each having a different attribute. And, by referring to the provided tactile feedbacks, the user may be capable of determining a most adequate pressure level that is to be applied when touching the corresponding object, so as to be capable dragging the touched object. More specifically, when a touch input having a low-level pressure with respect to the object 11 positioned over the first background image 40 is inputted, the display device may generate tactile feedback having a low frictional force. Accordingly, by referring to this tactile feedback, the user may be capable of knowing that the corresponding object can be moved and repositioned over the first background image, which has a smooth texture. Moreover, the user may also know that the corresponding object can be repositioned up to the right-side boundary region of the background image. In addition, when a touch input having a high-level pressure with respect to the object 11 positioned over the second background image 4 is inputted, the display device may generate tactile feedback having a high frictional force. Accordingly, by referring to this tactile feedback, the user may be capable of knowing that the corresponding object is positioned over the second background image, which has a rough texture. Moreover, the user may also be provided with information indicating that, since the frictional force between the object and the second background image is high, the corresponding object cannot be moved or repositioned by applying the high-level pressure. Accordingly, the user may drag the corresponding object by reducing the pressure level of the touch input. And, the display device may detect the reduced pressure level, which is applied by the user, as the low-level pressure, thereby being capable of moving and repositioning the corresponding object and displaying the repositioned object.

Figure 5:
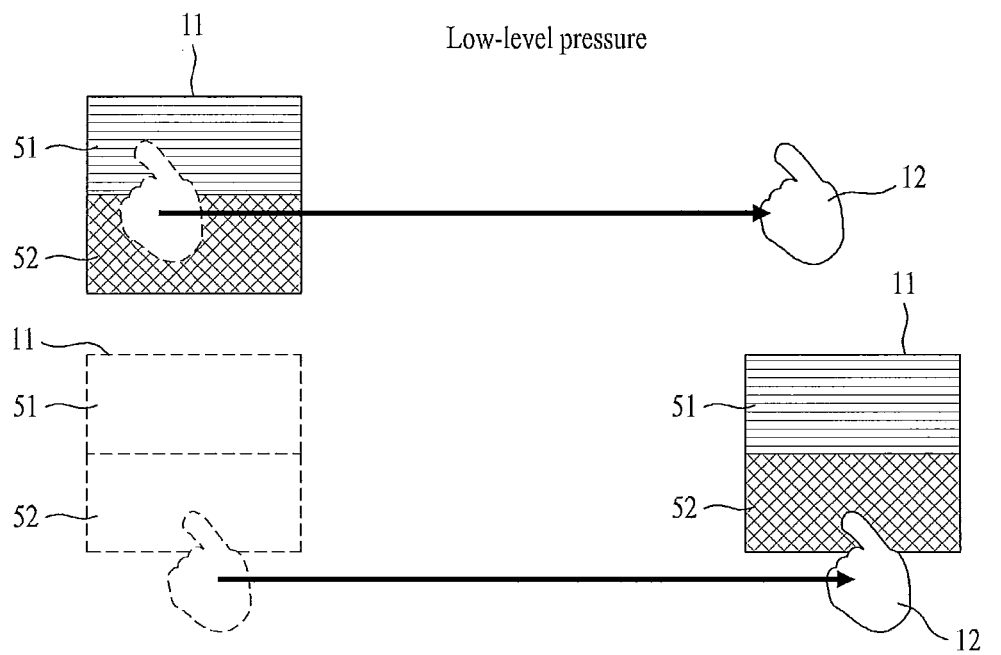
FIG. 5 illustrates a method of executing a user's touch input with respect to an attribute of an object having multiple regions according to an exemplary embodiment of the present invention.
Figure 5:
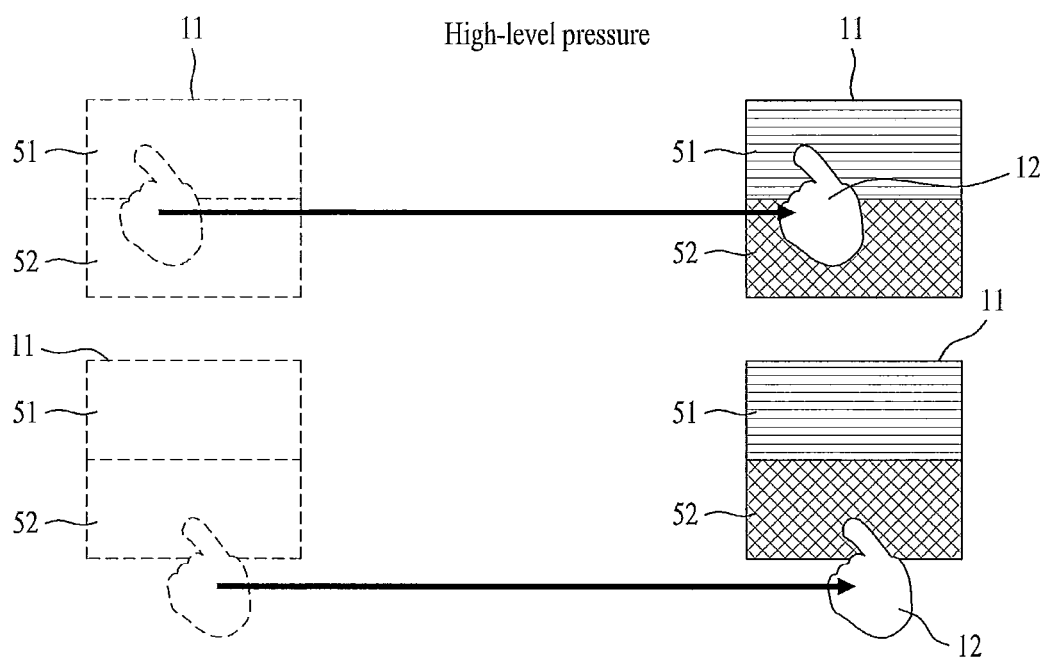

FIG. 5 illustrates a method of executing a user's touch input with respect to an attribute of an object having multiple regions according to an exemplary embodiment of the present invention. Herein, the object 11 may include multiple regions each having a different attribute. Referring to FIG. 5, texture is given as an example of the many attributes of an object. However, this is merely exemplary, and, therefore, the scope of the present invention will not be limited only to the examples presented herein. Accordingly, the display device may decide whether or not to apply the user's touch input to the corresponding object in accordance with the attributes respective to each region included in the displayed object.

The object 11 may include a first region 51 having a smooth texture and a second region 52 having a rough texture. The display device may determine a pressure threshold, which is required for moving and repositioning an object, with respect to the texture of each region being included in the object. The display device may set up a high pressure threshold for the first region 51 having a smooth texture, and the display device may set up a low pressure threshold for the second region 52 having a rough texture. When the pressure of a touch input 12 exceeds the predetermined pressure threshold, the display device may apply the corresponding touch input 12 to the respective object.

As shown in FIG. 5, when a touch input 12 dragging an object is detected to have a low-level pressure in the first region 51, the display device may leave the corresponding object in its initial position without moving or relocating the object. This is because the low-level pressure of the touch input 12 is lower than the pre-set pressure threshold of the first region 51, which is described above. Alternatively, when a touch input 12 dragging an object is detected to have a low-level pressure in the second region 52, the display device may move and reposition the object 11 to a new position in accordance with the touch input and may then display the newly positioned object. Since the pressure threshold of the second region 52 is set to a lower level with respect to its rough texture, the low-level pressure becomes greater than the pressure threshold of the second region 52.

When the pressure level of the touch input 12, which drags the object, exceeds the pressure threshold of the first region 51 and the pressure threshold of the second region 52, the display device may apply a touch input to an object regardless of the touched region. As shown in the lower portion of FIG. 5, when a touch input having a high-level pressure, which exceeds the pressure threshold of the first region and the pressure threshold of the second region, is being inputted, the display device may relocate the object to a new position in accordance with the touch input, regardless of the region in which the touch input has been detected.

Additionally, the display device may generate different tactile feedback for each of the first region 51 and the second region 52 of the corresponding object. The display device may generate a tactile feedback for the attribute of the touch input and the attributes of each region included in the object, and most particularly, for the texture of each region included in the object, and may then provide the generated tactile feedback to the user. Accordingly, the user may be provided with information indicating the adequate pressure level that is to be applied by the user when pressing on the corresponding region of the object, in order to allow the display device to apply the touch input to the corresponding object.

Figure 6:
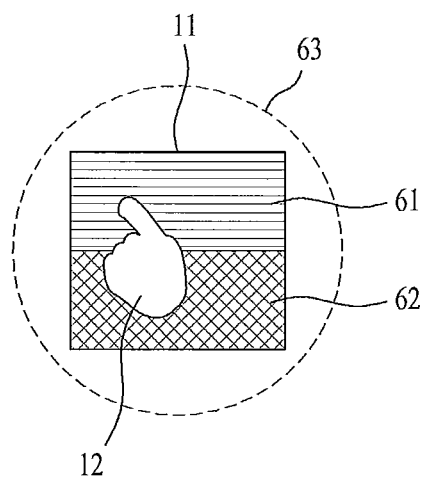
FIG. 6 illustrates a method of determining a limited movement range of an object with respect to a attribute of an object having multiple regions according to the exemplary embodiment of the present invention.
Figure 6:
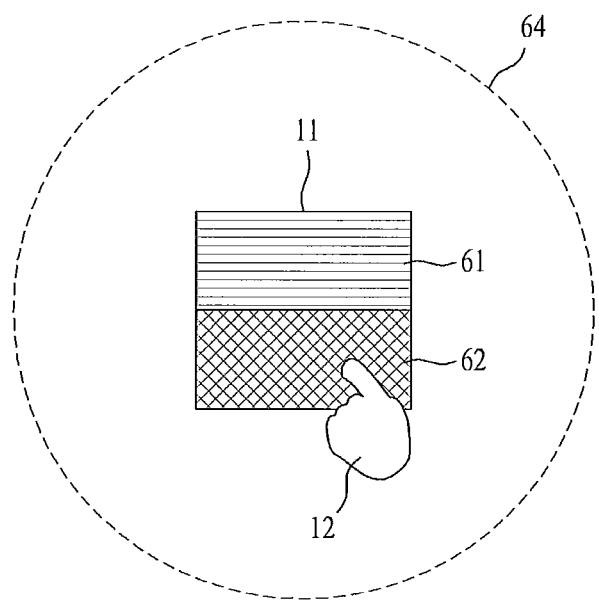

FIG. 6 illustrates a method of determining a limited movement range of an object with respect to an attribute of an object having multiple regions according to the exemplary embodiment of the present invention. Herein, the object 11 may include multiple regions each having a different attribute. Referring to FIG. 6, texture is given as an example of the many attributes of an object. However, this is merely exemplary, and, therefore, the scope of the present invention will not be limited only to the examples presented herein. Accordingly, the display device may determine a limited movement range of the corresponding object in accordance with the attributes respective to each region included in the displayed object.

The object 11 may include a first region 61 having a smooth texture and a second region 62 having a rough texture. The display device may determine a limited movement range within which the object can be moved and repositioned with respect to the texture of each region being included in the object. Herein, even when the display device detects the same pressure level, the display device may set up a smaller limited movement range 63 with respect to the first region having the smooth texture, and the display device may set up a larger limited movement range 64 with respect to the second region having the rough texture. The process of setting up of the limited movement range of an object with respect to the pressure level of a touch input may be applied as described above with reference to FIG. 2 and FIG. 3.

Figure 7:
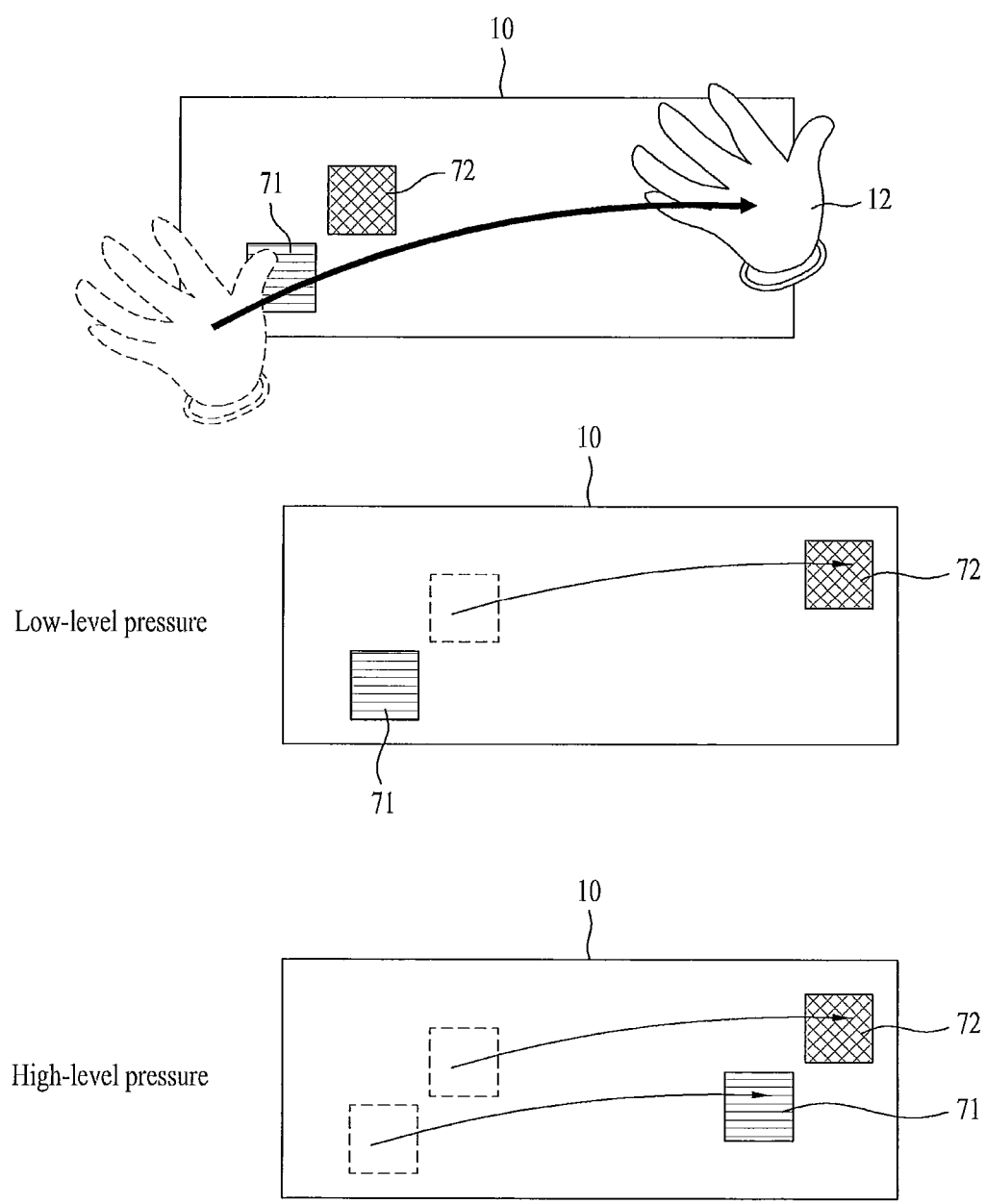
FIG. 7 illustrates an example corresponding to a case when touch inputs for multiple objects are being inputted and an exemplary method of executing the inputted touch inputs.

FIG. 7 illustrates an example corresponding to a case when touch inputs for multiple objects are being inputted and an exemplary method of executing the inputted touch inputs. When a touch input 12 is being inputted for each of multiple objects 71 and 72, which are displayed over a background image 10, the display device may detect the inputted touch input 12 and may then decide whether or not to apply the corresponding touch input 12 to each of the respective objects.

When a touch input changing the position of an object is inputted, the display device may compare the pressure threshold, which is determined for each object, with the pressure level of the touch input. Then, the display device may apply the corresponding touch input to an object having a pressure threshold lower than the pressure level of the corresponding touch input. Thereafter, the object being applied with the touch input may be moved and repositioned to a new position, thereby being displayed. Alternatively, for an object having a pressure threshold greater than the pressure level of the corresponding touch input, the display device may not apply the touch input to the corresponding object and may have the touch input by pass the corresponding object. Once the touch input bypasses the object, the corresponding object may be displayed at its initial position.

Referring to FIG. 7, the display device may display multiple objects and may determine a pressure threshold for each of the displayed objects. Herein, the pressure threshold may be decided based upon the attribute of each object. The display device may determine a first pressure threshold for a first object 71 having a smooth texture, and the display device may determine a second pressure threshold for a second object 72 having a rough texture. Herein, since the second object has a rough texture, the second object may be moved and repositioned by applying a low-level pressure. Accordingly, the second pressure threshold may have a lower value than the first pressure threshold.

When a touch input having a low-level pressure is simultaneously inputted for all of the objects, the display device may detect the inputted touch inputs and may then decide whether or not to apply the detected touch input to each object. For example, it may be assumed that the low-level pressure is lower than the first pressure threshold, and that the low-level pressure is greater than the second pressure threshold. Since the pressure level of the detected touch input is greater than the second pressure threshold of the second object 72, the display device may apply the detected touch input to the second object 72. And, since the pressure level of the detected touch input is lower than the first pressure threshold of the first object 71, the display device may have the touch input respective to the first object 71 bypass the first object 71. Accordingly, the first object 71 may be displayed at its initial position without being moved or repositioned.

When a touch input having a high-level pressure is inputted, the display device may detect the inputted touch input and may then decide whether or not to apply the detected touch input to each object. For example, it may be assumed that the high-level pressure is greater than the first pressure threshold and the second pressure threshold. Since the pressure level of the detected touch input is greater than the first and second pressure thresholds, the display device may apply the detected touch input to the first and second objects 71 and 72.

As described above with reference to FIG. 1, the display device may calculate a frictional force between each object and the user's finger with respect to the attribute of each object and to the pressure level of the touch input. The display device may determine the friction coefficient for each object in accordance with the texture of each object. Additionally, the display device may decide the frictional force between each object and the touch input by multiplying the predetermined friction coefficient by the pressure level of the touch input. Then, based upon the decided frictional force, the display device may decide whether or not to apply the corresponding touch input to each object.

Figure 8:
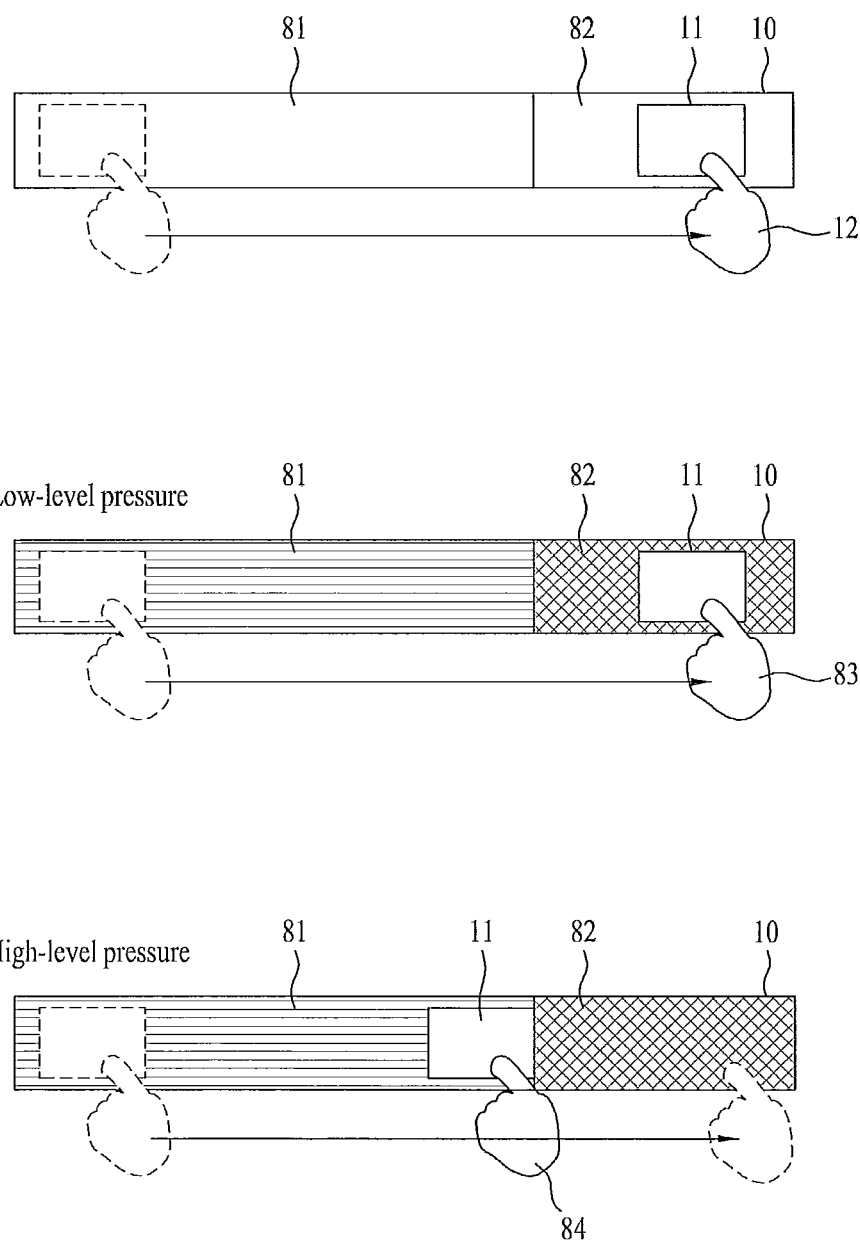
FIG. 8 illustrates a method of applying a touch input to an object with respect to an attribute of a background image having multiple regions according to the exemplary embodiment of the present invention.

FIG. 8 illustrates a method of applying a touch input to an object with respect to an attribute of a background image having multiple regions according to the exemplary embodiment of the present invention. Referring to FIG. 8, a background image 10 may be divided into multiple regions each having a different attribute. For example, the background image 10 may include a first region 81 and a second region 82 each having a different attribute. The display device may display an object 11 over the background image 10. Referring to FIG. 8, a touch input 12 corresponds to an inputted motion dragging the object 11 from a left-side boundary region of the background image to a right-side boundary region of the same background image. Herein, the display device may decide whether or not to apply the touch input 12 corresponding to each region included in the background image 10 to the displayed object 11. The display device may determine a pressure threshold with respect to the texture of each region and the pressure level of the touch input. Accordingly, when the display device detects a touch input having a pressure level lower than the pressure threshold, which is determined for each region, the display device may apply the corresponding touch input to the displayed object. Alternatively, when the display device detects a touch input having a pressure level greater than or equal to the pressure threshold, which is determined for each region, the display device may have the corresponding touch input bypass the displayed object without being applied to the displayed object, starting from the time point when the corresponding touch input has been detected.

For example, a first region 81 of the background image may be displayed to have a smooth texture, and a second region 82 of the background image may be displayed to have a rough texture. The display device may determine a first pressure threshold respective to the first region 81, and the display device may determine a second pressure threshold respective to the second region 82. At this point, the first pressure threshold may have a value greater than that of the second pressure threshold. Since the display device sets up a relatively greater pressure threshold with respect to the smooth texture of the first region 81, even if the display device detects a touch input having a pressure level greater than the second pressure threshold of the second region 82 having the rough texture, the display device may apply the detected touch input to the corresponding object.

The display device may detect a touch input 83 having a low-level pressure. Herein, it will be assumed that the low-level pressure corresponds to a value that is lower than the first pressure threshold of the first region and the second pressure threshold of the second region. Since the pressure level of the detected touch input 83 has a value lower than the pressure thresholds of the first region and the second region, the display device may apply the detected touch input 83 to the first region 81 and the second region 82. Eventually, in accordance with the applied touch input, the object may be moved and repositioned from the left-side boundary of the first region to the right-side boundary of the second region and may be displayed accordingly.

The display device may detect a touch input 84 having a high-level pressure. Herein, it will be assumed that a high-level pressure is lower than a first pressure threshold of a first region and greater than or equal to a second pressure threshold of a second region. Since the pressure of the detected touch input 84 has a value lower than the first pressure threshold, the display device may apply the touch input 84 to the object, which is located in the first region. Accordingly, the object may be moved and repositioned up to the right-side boundary of the first region and may then be displayed. However, since the detected touch input 84 has a value greater than or equal to the second pressure threshold, the display device may have the touch input 84 bypass the object located in the second region without being applied to the object. Eventually, the corresponding object may be moved and repositioned from the left-side boundary of the first region to the right-side boundary of the first region, so as to be displayed. And, even if the touch input is moved and relocated to the right-side boundary of the second region, the corresponding object may remain in the right-side boundary of the first region, so as to be displayed.

As described above in FIG. 4, the display device may generate tactile feedback with respect to each region of the background image. When the object is moved and repositioned within the first region of the background image, the display device may generate a tactile feedback with respect to the attribute of the first region and the pressure level of the touch input. Alternatively, when the object is moved and repositioned within the second region of the background image, the display device may generate a tactile feedback with respect to the attribute of the second region and the pressure level of the touch input. With respect to the tactile feedback generated in the first region, the display device may provide a smoother sense of touch, i.e., a tactile feedback having a smaller frictional force as compared to the tactile feedback, which is generated in the second region.

While the object moves from the first region to the second region, when the corresponding object is being displayed over both regions, the display device may generate a tactile feedback with respect to the attribute of the first region, the attribute of the second region, and the pressure level of the touch input. The attribute of the first region and the attribute of the second region may be considered based upon the ratio of the corresponding object overlaying on each region. Alternatively, the attribute of the first region and the attribute of the second region may be considered by calculating a mid-point value of the two regions. For example, the attribute of each region may correspond to the friction coefficient, wherein the friction coefficient of the first region is set to be equal to '1', and the friction coefficient of the second region is set to be equal to '2'. When 30% of the corresponding object overlays on the first region, and when 70% of the corresponding object overlays on the second region, the friction coefficient based upon the occupation ratio of the first region and the second region, may be equal to 1.7, which corresponds to the sum of 0.3 and 1.4. When the display device choose to consider the mid-point value of the first and second regions, by assuming that a first 50% of the corresponding object overlays on the first region and that the second 50% of the corresponding object overlays on the second region, the friction coefficient may be equal to 1.5. With respect to the friction coefficient, which is calculated by using the method described above, and the pressure level of the touch input, the display device may generate a tactile feedback respective to the object, which is displayed at the boundary regions of the first region and the second region.

Referring to FIG. 8, when the touch input has a high-level pressure, the display device cannot move the object from the first region to the second region and, therefore, cannot display the repositioned object. Instead, the display device may stop the movements of the object at the right-side boundary of the first region, so as to display the corresponding object. This is because the pressure level of the detected touch input has a value greater than or equal to the pressure threshold of the second region. When the object reaches the right-side boundary of the first region, the display device may generate a separate tactile feedback. The display device may generate a tactile feedback indicating that the corresponding object cannot be repositioned to the second region. For example, the display device may generate a tactile feedback providing a sense that the object bumps into a wall at the boundaries of the first region and the second region. Accordingly, such tactile feedback may provide the user with information indicating that the corresponding object cannot be moved and repositioned in the first region and the second region when dragged under a high-level pressure. In another example, the display device may also generate a tactile feedback providing a sense that the object slips away from the user's finger, instead of being moved and repositioned in accordance with the detected touch input at the boundaries of the first region and the second region. At this point, the tactile feedback may be generated with respect to the texture of the object and the pressure of the touch input. Accordingly, such tactile feedback may provide the user with information indicating that the object cannot move from the right-side boundary of the first region to the second region, and that the corresponding object slips away from the user's finger, so as to remain in the first region.

Figure 9:
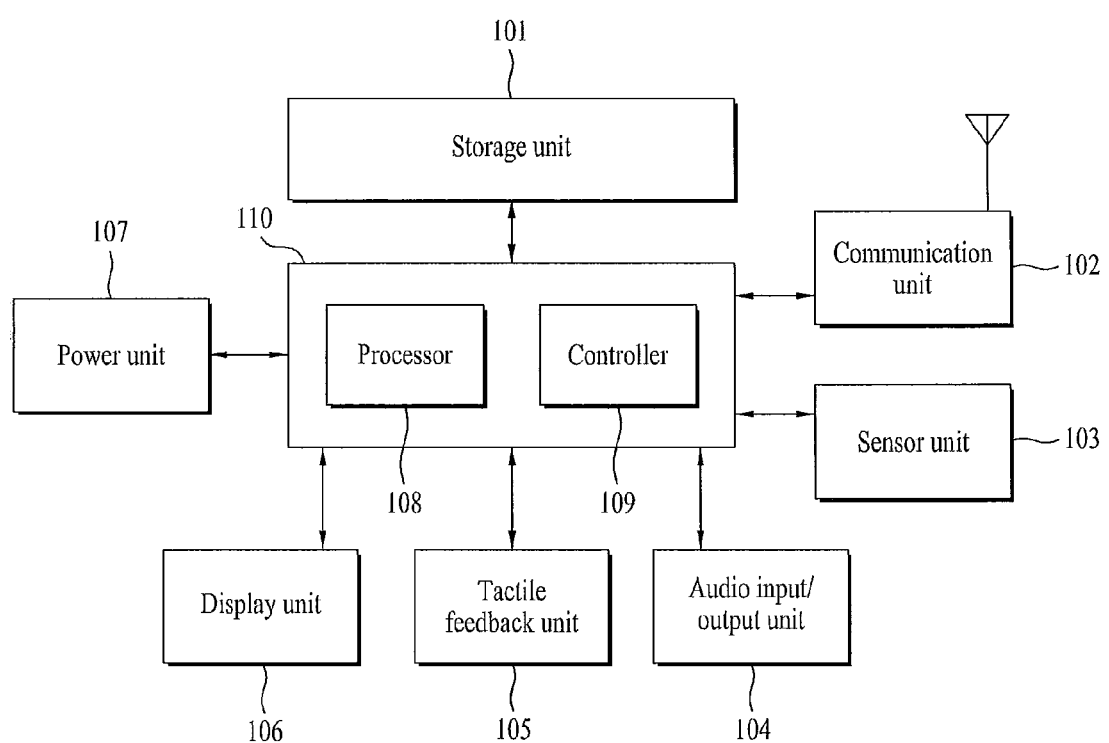
FIG. 9 illustrates a block view showing an exemplary structure of a display device according to an exemplary embodiment of the present invention.

FIG. 9 illustrates a block view showing an exemplary structure of a display device according to an exemplary embodiment of the present invention. Referring to FIG. 9, the display device may include a storage unit 101, a communication unit 102, a sensor unit 103, an audio input/output unit 104, a tactile feedback unit 105, a display unit 106, a power unit 107, a processor 108, and a controller 109.

The storage unit 101 may store diverse digital data, such as video data, audio data, still picture images, moving picture images, applications, and so on. The storage unit 101 refers to diverse digital data storage spaces, such as a flash memory, a Hard Disk Drive (HDD), a Solid State Drive (SDD), and so on. The display device according to the present invention may store an object that is being displayed and an attribute of the background image in the storage unit 101. The display device may use the stored object and the attribute of the background image, so as to determine and set up a pressure threshold or a frictional force threshold of the object and attribute of the background image. The storage unit 101 may be included as an optional element depending upon the design of the display device.

The communication unit 102 may perform communication with an external source outside of the display device, by using diverse protocols, and the communication unit 102 may also transmit and/or receive data. The communication unit 102 may access an external network via wired or wireless communication, so as to transmit and/or receive digital data. Herein, the communication unit 102 may be included as an optional element depending upon the design of the display device.

The sensor unit 103 uses multiple sensors mounted on the display device, so that information on the environment, which is recognized by the user's input or by the display device can be delivered to the controller 109. The sensor unit 103 may include a plurality of sensing means. For example, the plurality of sensing means may include a piezoelectric sensor, a gravity sensor, a motion sensor, a Gyro sensor, an acceleration sensor, an inclination sensor, a pressure sensor, an audio sensor, a video sensor, a Global Positioning System (GPS) sensor, a touch sensor, and so on. In the description of the present invention, the touch sensor may be capable of detecting the user's touch input. The display device may use the touch sensor so as to detect a touch input, which selects an object and drags the selected object. Herein, the touch sensor may also detect a position to which the object is being moved and repositioned by the touch input. The piezoelectric sensor or the pressure sensor may detect a pressure applied on the user's touch input. The display device may use the piezoelectric sensor or the pressure sensor, so as to sense the pressure of the user's input. The display device may compare the pressure of the sensed touch input with a pressure threshold or a frictional force threshold, which is determined with respect to each object or background image, so as to decide whether or not to apply the sensed touch input to the corresponding object. Furthermore, the display device may generate tactile feedback with respect to the pressure of the sensed touch input.

The sensor unit 103 is a collective term for the above-described plurality of sensing means. Herein, the sensor unit 103 may detect the touch input having diverse attributes and may then deliver a sensed result, so as to allow the display device to perform operations respective to the sensed result. The above-described sensors may be included in the display device as separate elements, or at least one or more of the above-described sensors may be collectively included as a separate element block in the display device.

The audio input/output unit 104 may include an audio output means, such as speakers, and an audio input means, such as a microphone. Herein, the audio input/output unit 104 may perform audio output from the display device and audio input to the display device. The audio input/output unit 104 may also be used as an audio sensor. In the display device according to the present invention, the audio input/output unit may correspond to an optional element.

The tactile feedback unit 105 may use a fine vibration actuator so as to provide tactile feedback to the user's finger or a stylus pen, which touches the display unit. The tactile feedback unit 105 may control the vibration frequency and the vibration amplitude. And, accordingly, the tactile feedback unit 105 may control the frictional force between the user's finger and the display unit. Additionally, the tactile feedback unit 105 may generate fine electric currents on the display unit, so as to provide the tactile feedback to the user. The tactile feedback unit 105 may control intensity, generation cycle period of the electric current. And, accordingly, the user may be capable of sensing different senses of touch. Furthermore, the tactile feedback unit 105 may use ultrasonic resonance, so as to provide tactile feedback. The tactile feedback unit 105 may control the cycle period of generating resonance frequency and resonance, so as to be capable of providing diverse tactile feedback.

The display unit 106 may output an image on a display screen. Herein, when the display corresponds to a touch sensitive display, the display unit 106 may be used as the above-described touch sensor. Accordingly, the display unit 106 may be capable of detecting an inputted touch input and may deliver the detected touch input to the controller 109. The display unit 106 may either display an image on a display panel, or may perform a function of controlling image display. The display unit 106 according to the present invention may display an object and a background image and may also detect the user's touch input. Moreover, by being combined with the above-described tactile feedback unit 105, the display unit 106 may also provide the user with tactile feedback. Herein, the display unit 106 may include a flexible display.

The power unit 107 corresponds to a power source, which is connected to a battery within the display device or to an external power source, thereby being capable of supplying power to the display device. In the display device according to the present invention, the power unit 107 may be included as an optional element.

The processor 108 may execute diverse applications, which are stored in the storage unit 101 and may also process data existing in the display device.

The controller 109 may control diverse unit included in the display device, as described above, and may manage data transmission and/or reception between the above-described units.

The processor 108 and the controller 109 may be provided as a single chip 110, thereby being capable of collectively performing each of the above-described operations. In this case, the single 110 may hereinafter be referred to as the controller 109. In the description of the present invention, the controller 109 may determine a pressure threshold or a frictional force threshold respective to a displayed object and background image. Herein, the controller 109 may either use the pressure threshold respective to the object or may use the pressure threshold respective to the background image, so as to control the displayed object. When the pressure level of a touch input respective to an object exceeds the pressure threshold of the corresponding object, the controller 109 may apply the touch input to the object. Alternatively, when the pressure level of the touch input is less than or equal to the pressure threshold of the corresponding object, the touch input may bypass the object without being applied to the corresponding object.

Additionally, when the pressure level of a touch input respective to an object is lower than the pressure threshold of the background image, the controller 109 may apply the touch input to the corresponding object. Also, when the pressure level of a touch input respective to an object is lower than the pressure threshold of the background image, the controller 109 may apply the touch input to the corresponding object, so that the controller 109 can perform control operations enabling the corresponding object to be moved and repositioned over the background image. Alternatively, when the pressure level of a touch input respective to an object is greater than or equal to the pressure threshold of the background image, the controller 109 may not move or reposition the corresponding object. The controller 109 may decide whether or not to apply the touch input to the corresponding object, as described above. Then, based upon the decision made by the controller 109, the controller 109 may display the corresponding object on the display unit 106.

As a block view showing the exemplary structure of the display device according to an exemplary embodiment of the present invention, each of the separately marked blocks represents the respective element included in the display device, each element being divided on a logical basis. Accordingly, the elements of the above-described display device may be mounted and provided in the display device as a single chip or as multiple chips, based upon the system design of the display device according to the present invention.

Figure 10:
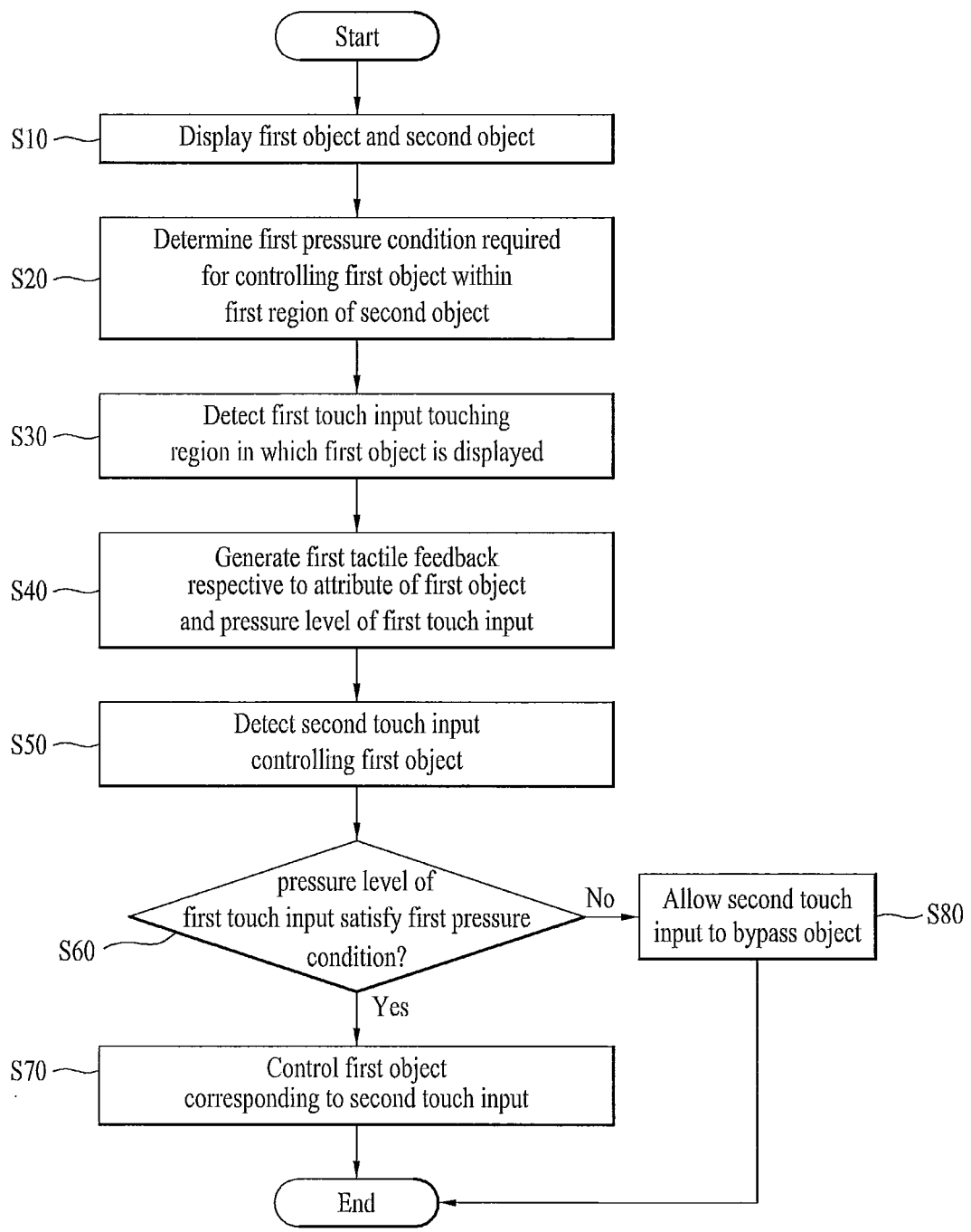
FIG. 10 illustrates a flow chart showing the process steps of a method for displaying an object with respect to a touch input of a display device according to the exemplary embodiment of the present invention.

FIG. 10 illustrates a flow chart showing the process steps of a method for displaying an object with respect to a touch input of a display device according to the exemplary embodiment of the present invention. The display device may display an object and a background image (S10). Herein, the display device may first display the background image and may then display the object over a first region of the background image.

Thereafter, the display device may determine a first pressure condition for dragging the object over the background image (S20). Herein, the display device may determine a first pressure condition for dragging the object over the first region of the background image. The display device may determine the first pressure condition with respect to an attribute of the first region of the background image and an attribute of the object. The attribute of the background image may include texture, mass, surface friction coefficient, degree of inclination, shape, and so on, of the displayed background image. And, the attribute of the object may include texture, mass, surface friction coefficient, shape, and so on, of the displayed object.

As an example of the pressure condition, the display device may determine information indicating whether or not the pressure level of a first touch input exceeds the pressure threshold, which is determined with respect to the texture of the first region of the background image and the texture of the object, as the first pressure condition. The display device may also determine a friction coefficient between the background image and the object with respect to the texture of the first region of the background image and the texture of the object. Also, the display device may determine a friction coefficient between an object and the user's finger with respect to the texture of the object. Based upon the friction coefficients, which are determined as described above, the display device may determine a minimum pressure level value, which is required for dragging and moving an object over the first region of the background image, as the pressure threshold. As the texture of the object becomes smoother, the display device may set the pressure threshold to be equal to a higher value. And, conversely, as the texture of the object becomes rougher, the display device may set the pressure threshold to be equal to a lower value. Furthermore, with respect to the same object, the display device may determine different pressure threshold value in accordance with the texture of a region of the background image in which the corresponding object is located.

According to another embodiment of the present invention, the display device may determine information indicating whether or not the pressure level of the first touch input is included within a pressure level range, which includes an upper bound value corresponding to the texture of the first region of the background image and a lower bound value corresponding to the texture of the object, as the first pressure condition. As described above with reference to FIG. 1, the display device may decide a pressure threshold with respect to the texture of the object, and the display device may determine the decided pressure threshold as the lower bound value of the first pressure level range. As the texture of the object becomes smoother, the display device may set the lower bound value of the first pressure level range to be equal to a higher value. And, conversely, as the texture of the object becomes rougher, the display device may set the lower bound value of the first pressure level range to be equal to a lower value. Since the frictional force between the two objects is equivalent to a friction coefficient being multiplied by the pressure level, when the friction coefficient becomes higher due to the rough texture of the corresponding object, the same frictional force may be obtained by applying a low pressure level. Therefore, the lower bound value of a pressure level range, which is required for moving an object having a smooth texture, may be set to have a value greater than the lower bound value of the pressure level range, which is required for moving an object having a rough texture.

As described above with reference to FIG. 4, the display device may decide a pressure threshold with respect to the texture of the background image, and the decided pressure threshold may be determined as the upper bound value of the first pressure level range. As the texture of the background image becomes smoother, the display device may set the upper bound value of the first pressure level range to be equal to a higher value. And, conversely, as the texture of the background image becomes rougher, the display device may set the upper bound value of the first pressure level range to be equal to a lower value. As the friction coefficient becomes higher due to the rough texture of the background image, the frictional force between the object and the background image may be simulated to a higher level with respect to a low pressure level. Accordingly, the upper bound value of a pressure level range that can move an object over the background image having a smooth texture, may be set to have a value greater than the upper bound value of a pressure level range that can move an object over the background image having a rough texture.

Subsequently, the display device may detect a first touch input, which touches a region in which the object is being displayed (S30). The display device may detect a first touch input inputted with respect to the object by using a touch sensor. And, the display device may then use the piezoelectric sensor or pressure sensor, so as to detect the pressure level of the first touch input. In the subsequent process steps, the display device may generate tactile feedback, based upon the pressure level of the first touch input.

Thereafter, the display device may generate a first tactile feedback with respect to the attribute of the object and the pressure level of the first touch input (S40). For example, when the texture of the object is used as the attribute of the corresponding object, as described above with reference to FIG. 1, the display device may calculate a friction coefficient respective to the texture of the object, and the display device may also calculate a frictional force between the object and the user's finger with respect to the pressure level of the first touch input. The display device may use the tactile feedback unit so as to generate a tactile feedback in accordance with the calculated frictional force, thereby delivering the generated tactile feedback to the user. The display device may use ultrasonic resonance so as to generate the tactile feedback, and the display device may control and adjust the resonance frequency and amplitude in order to generate diverse types of tactile feedback.

Afterwards, the display device may detect a second touch input, which drags the object (S50). The display device may detect the second touch input dragging the object, which is displayed in the first region of the background image, to another region. Herein, the second touch input may be inputted to the display device in succession to the first touch input. The display device may detect the second touch input, which allows the user to move and reposition the corresponding object. And, in a subsequent process step, the display device may decide whether or not to apply the detected second touch input to the corresponding object.

Thereafter, the display device may decide whether or not the pressure level of the first touch input satisfies the first pressure condition (S60). Furthermore, when it is determined that the pressure level of the first touch input satisfies the first pressure condition, the display device may apply the second touch input to the corresponding object (S70). Herein, the display device may apply the second touch input, which drags the object to another region, to the corresponding object, so that the object can be moved and repositioned in accordance with the second touch input, thereby being displayed from a new position. As described above with reference to FIG. 2 and FIG. 3, in applying the second touch input to the corresponding object, the display device may determine a limited movement range of the object with respect to the pressure level of the first touch input. Herein, the limited movement range refers to a maximum movement distance to which the object can be moved and repositioned by the second touch input. Accordingly, the display device may move and relocate the corresponding object in accordance with the second touch input, thereby displaying the repositioned object. When the corresponding object is dragged within the limited movement range by the second touch input, the display device may display the object from the final position, to which the corresponding object has been repositioned. If the dragging motion of the second touch input applied to the corresponding object exceeds the limited movement range, the display device recovers the initial position of the corresponding object prior to being dragged by the second touch input and displays the corresponding object from its initial position.

As described above in FIG. 4, the display device may determine a movement speed of the object, with respect to the attribute of the background image and the attribute of the object. Based upon the determined movement speed of the object, the display device may move the object and display the relocated object. For example, in case the background image has a rough texture, the display device may relocate the object at a movement speed that is slower than that of the detected second touch input, thereby displaying the relocated object. More specifically, the display device may calculate the degree of interference of the background image, or the display device may consider the attribute of the object, so as to determine the speed at which the object is being moved, thereby being capable of displaying the object accordingly.

As described above with reference to FIG. 4, when the object is being moved and repositioned by the second touch input, the display device may generate a second tactile feedback. As the corresponding object is being moved and repositioned, the display device may simulate the frictional force, which is generated between the object and the background image, so as to generate the second tactile feedback. The second tactile feedback may be generated with respect to the attribute of the object, the attribute of the first region of the background image, and the pressure level of the second touch input.

When two regions each having a different attribute exists within the background image, as described above with reference to FIG. 8, the display device may move and reposition the corresponding object with respect to the attributes of each region, thereby displaying the repositioned object. Herein, it may be assumed that the background image includes a first region and a second region, wherein the second region has an attribute different from that of the first region. And, it may also be assumed that the second touch input drags the corresponding object from the first region to the second region. The display device may determine a second pressure condition for dragging the corresponding object existing within the second region of the background image.

According to an embodiment of the present invention, the display device may determine the information indicating whether or not the pressure level of the second touch input exceeds the pressure threshold, which is determined with respect to the texture of the second region of the background image and the texture of the corresponding object, as the second pressure condition. According to another embodiment of the present invention, the display device may determine the information indicating whether or not the pressure level of the second touch input includes a lower bound value corresponding to the attribute of the object and an upper bound value corresponding to the attribute of the second region of the background image, as the second pressure condition.

If the pressure level of the second touch input satisfies the second pressure condition, the display device may move and reposition the corresponding object from the first region to the second region in accordance with the second touch input and may then display the repositioned object. When the object is displayed in both the first region and the second region, the display device may generate a tactile feedback respective to the attribute of the corresponding object, the attribute of the first region, the attribute of the second region, and the pressure level of the second touch input. Additionally, when the object is repositioned to the second region, the display device may generate a tactile feedback respective to the attribute of the corresponding object, the attribute of the second region within the background image, and the pressure level of the second touch input.

Alternatively, if the pressure level of the second touch input does not satisfy the second pressure condition, the display device may display the corresponding object while maintaining the position of the object in the first region and at boundaries of the first region and the second region. The display device may generate a tactile feedback respective to the attribute of the corresponding object and the pressure level of the second touch input, at the point when the object touches the boundaries of the first region and the second region. More specifically, in case the object fails to move beyond the boundaries of the first region and the second region and slips away from the user's finger, the display device may generate a tactile feedback providing a sense of touch indicating that the corresponding object is slipping away from the user's finger.

Finally, in case the pressure level of the first touch input does not satisfy the first pressure condition, the display device may have the second touch input bypass the corresponding object (S80). Even if the display device detects a second touch input, which drags the corresponding object, the display device may have the second touch input bypass the corresponding object without applying the detected second touch input to the object. Accordingly, the display device may maintain the position of the object to its initial position within the first region of the background image and may display the corresponding object from the initial position of the object.

As described above, the display device according to the present invention may decide whether or not to apply a detected touch input to a displayed object, based upon the attribute of the displayed object, the attribute of the background image, and the pressure level of the detected touch input.

According to the exemplary embodiments of the present invention, the display device and the method for controlling the same have the following advantages. First of all, a pressure condition may be determined for each object in accordance with the attribute of the displayed object or the attribute of the background image. Also, the present invention may decide whether or not to apply a detected touch input to a displayed object in accordance with the pressure level of the detected touch input. Additionally, the present invention may determine a movement speed of the object based upon the displayed background image.

Moreover, according to the embodiment of the present invention, the display device according to the present invention may determine a limited movement range of an object based upon the pressure level of a detected touch input or the displayed background image. Furthermore, when an object is being moved and repositioned within the background image, which includes regions each having a different attribute, by the touch input, the corresponding touch input may be applied to the object based upon the attribute of each region included in the background image. Finally, with respect to the object including multiple regions each having a different attribute, the present invention may decide whether or not to apply a touch input to the corresponding object, in accordance with regions included in the object from which the touch input has been detected.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a display device, the method comprising:
    displaying a first object and a second object, wherein a first portion of the second object is overlaid with at least a portion of the first object;
    acquiring a first pressure condition required for moving the displayed first object on the second object, wherein the first pressure condition is acquired with respect to an attribute of the first object and an attribute of the first portion of the second object;
    detecting a first touch input touching the displayed first object;
    detecting a second touch input moving the first object, wherein the second touch input is inputted in succession to the first touch input;
    moving the first object corresponding to the second touch input when a pressure level of the first touch input satisfies the first pressure condition;
    acquiring a second pressure condition for controlling the first object within a second portion of the second object, wherein the second pressure condition is acquired with respect to the attribute of the first object and to an attribute of the second portion of the second object;
    moving and repositioning the first object from the first portion to the second portion, when a pressure level of the second touch input satisfies the second pressure condition; and
    maintaining a position of the first object in the first portion, when the pressure level of the second touch input does not satisfy the second pressure condition.

2. The method of claim 1, wherein the first pressure condition corresponds to information indicating whether or not the pressure level of the first touch input exceeds a pressure threshold, the pressure threshold being acquired with respect to a texture of the first object and a texture of the first portion of the second object.

3. The method of claim 1, wherein the first pressure condition corresponds to information indicating whether or not the pressure level of the first touch input is included within a pressure level range, the pressure level range being acquired to include a lower bound value corresponding to a texture of the first object and an upper bound value corresponding to a texture of the first portion of the second object.

4. The method of claim 1, wherein the step of moving the first object corresponding to the second touch input comprises:
    acquiring a limited movement range of the first object with respect to a pressure level of the first touch input and a texture of the first object, wherein the limited movement range corresponds to a maximum movement distance to which the first object can be moved by the second touch input; and
    moving and repositioning the first object in accordance with the second touch input and displaying the repositioned first object.

5. The method of claim 4, wherein the step of moving and repositioning the first object in accordance with the second touch input and displaying the repositioned first object comprises:
    displaying the first object in a position to which the first object is repositioned, when the first object is moved within the limited movement range by the second touch input; and
    returning the first object back to its initial position prior to being moved, when the movement of the first object performed by the second touch input exceeds the limited movement range.

6. The method of claim 4, wherein the step of moving the first object corresponding to the second touch input further comprises:
    displaying a boundary up to which the first object is moved with respect to the acquired limited movement range.

7. The method of claim 4, wherein, in the step of moving and repositioning the first object in accordance with the second touch input and displaying the repositioned first object, the first object is displayed along a movement path included in the limited movement range, when the movement of the first object performed by the second touch input exceeds the limited movement range.

8. The method of claim 1, wherein, in the step of acquiring the first pressure condition, the first object includes a plurality of portions, each of the portions having a different attribute, and
wherein the pressure condition of each portion is differently set up for each portion.

9. The method of claim 1, wherein the step of moving the first object corresponding to the second touch input comprises:
acquiring a movement speed of the first object with respect to the attribute of the first object and the attribute of the first portion of the second object;
moving and repositioning the first object at the movement speed of the first object, the movement speed of the first object being acquired in accordance with the second touch input; and
displaying the repositioned object.

10. The method of claim 1, further comprising:
generating a first tactile feedback respective to the attribute of the first object and a pressure level of the first touch input.

11. The method of claim 10, wherein the attribute of the first object includes a texture, and wherein, in the step of generating a first tactile feedback, an intensity of a frictional force of the first tactile feedback is controlled with respect to a texture of the first object.

12. The method of claim 10, wherein, in the step of generating a first tactile feedback, the intensity of the frictional force of the first tactile feedback is controlled in proportion to a pressure level of the first touch input.

13. The method of claim 10, wherein, in the step of generating a first tactile feedback, the tactile feedback is generated by using ultrasonic resonance, and wherein the intensity of the frictional force of the first tactile feedback is control by changing a frequency and amplitude of the ultrasonic resonance.

14. The method of claim 1, wherein the step of moving the first object corresponding to the second touch input comprises:
generating a second tactile feedback respective to the second touch input, wherein the second tactile feedback is generated with respect to the attribute of the first object, the attribute of the first portion of the second object, and a pressure level of the second touch input; and
moving the first object in accordance with the second touch input and displaying the moved first object.

15. The method of claim 1, wherein, when the first object is repositioned in the second portion, a tactile feedback is generated with respect to the attribute of the first object, the attribute of the second portion of the second object, and the pressure level of the second touch input.

16. The method of claim 1, wherein, when the first object is displayed between boundaries of the first portion and the second portion, a tactile feedback is generated with respect to the attribute of the first object, the attribute of the first portion, the attribute of the second portion, and to the pressure level of the second touch input.

17. The method of claim 1, wherein, in the step of maintaining the position of first object, a tactile feedback is generated with respect to the attribute of the first object and the pressure level of the second touch input, at a time point when the first object touches boundaries between the first portion and the second portion.

18. The method of claim 1, wherein the step of moving the first object corresponding to the second touch input comprises:
deciding a degree of interference between the first object and the second object;
reducing a control distance of the second touch input with respect to the decided degree of interference; and
moving and repositioning the first object in accordance with the reduced control distance and displaying the repositioned object.

19. The method of claim 18, wherein the degree of interference is decided with respect to a texture of the second object and a pressure level of the second touch input.

20. The method of claim 1, wherein the second object corresponds to a background image being displayed on the display device.

21. A display device, comprising:
a touch sensitive display unit configured to detect a touch input; and
a controller configured to control the touch sensitive display unit,
wherein the display device:
displays a first object and a second object, wherein a first portion of the second object is overlaid with at least a portion of the first object;
acquires a first pressure condition required for moving the displayed first object on the second object, wherein the first pressure condition is acquired with respect to an attribute of the first object and an attribute of the first portion of the second object;
detects a first touch input touching the displayed first object;
detects a second touch input moving the first object, wherein the second touch input is inputted in succession to the first touch input;
moves the first object corresponding to the second touch input, when a pressure level of the first touch input satisfies the first pressure condition;
acquires a second pressure condition for controlling the first object within a second portion of the second object wherein the second pressure condition is acquired with respect to the attribute of the first object and to an attribute of the second portion of the second object;
moves and repositions the first object from the first portion to the second portion, when a pressure level of the second touch input satisfies the second pressure condition; and
maintains a position of the first object in the first portion, when the pressure level of the second touch input does not satisfy the second pressure condition.

* * * * *